(No Model.)

F. DAMOUR.
SELF PROPELLED VEHICLE.

No. 588,054. Patented Aug. 10, 1897.

Witnesses.
Mattison C. Noland.
Robert H. Carter

Inventor.
Ferdinand Damour

THE NORRIS PETERS CO., PHOTO-LITHO., WASHINGTON, D. C.

UNITED STATES PATENT OFFICE.

FERDINAND DAMOUR, OF BOLCKOW, MISSOURI.

SELF-PROPELLED VEHICLE.

SPECIFICATION forming part of Letters Patent No. 588,054, dated August 10, 1897.

Application filed February 24, 1896. Serial No. 580,616. (No model.)

*To all whom it may concern:*

Be it known that I, FERDINAND DAMOUR, residing at Bolckow, in the county of Andrew and State of Missouri, have invented a new and useful Improvement in Self-Propelled Vehicles, of which the following is a specification.

My invention is an improvement in self-propelled vehicles, being in the nature of a manumotor.

The invention consists in the novel constructions, combinations, and arrangements of parts, as will be hereinafter described, and pointed out in the claims.

Figure 1:
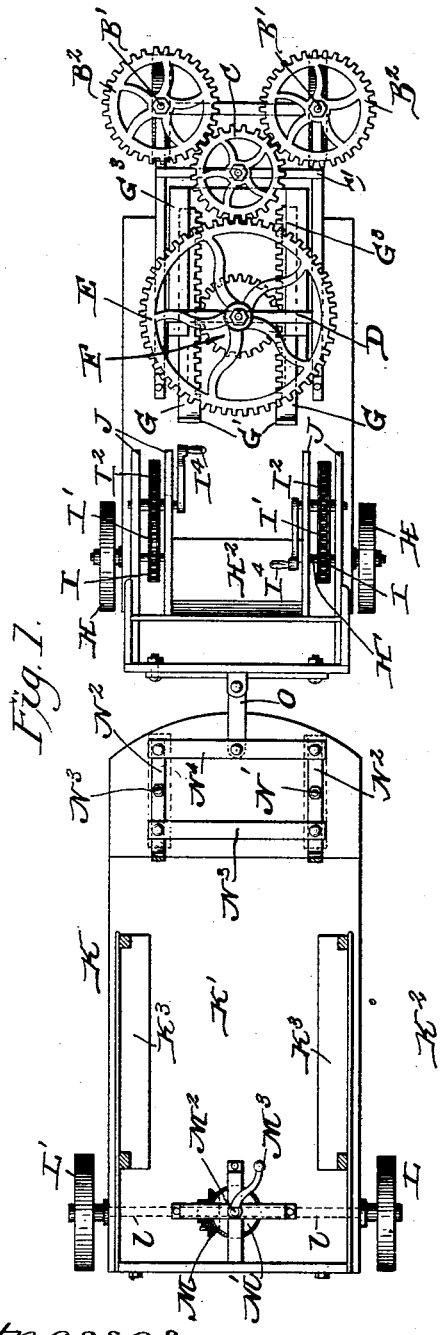
Figure 2:
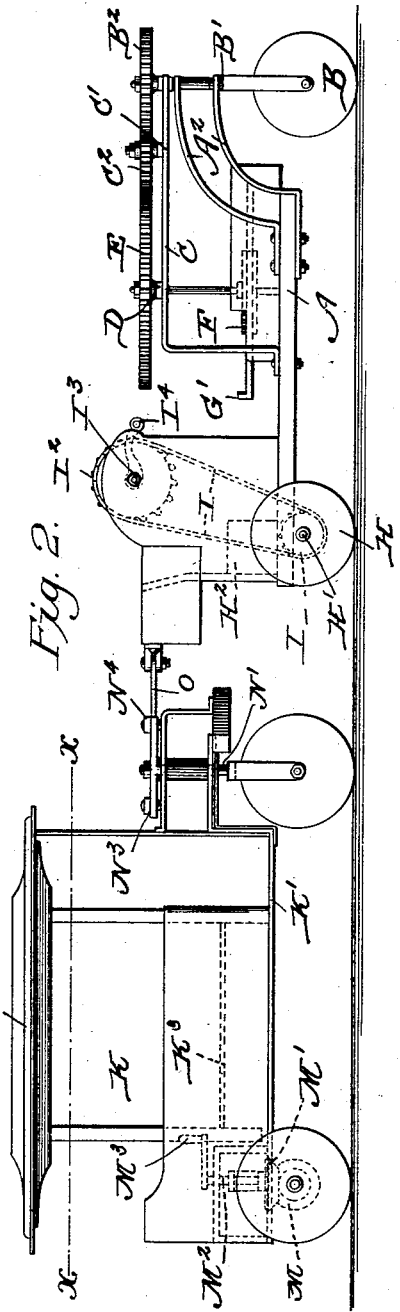

In the drawings, Figure 1 is a plan view of my apparatus, the cover of the rear car being removed; and Fig. 2 is a side elevation.

The front car A has a suitable frame comprising a bed-frame A' having at its front end upwardly-curved brackets $A^2$ at each side and serving to support the front steering-wheels B, whose upright shafts B' are journaled in the bracket $A^2$ and are provided at their upper end with the gear-wheels $B^2$, one for each steering-wheel B, as shown. The shafts B' also journal in the front ends of frame C, which are connected just in rear of the wheels B' by a cross-bar C', which supports at its center the counter-gear $C^2$, which is meshed with both gears B', as best shown in Fig. 1. In rear of the cross-bar C' the side frames C are connected by a rear cross-bar D, which supports at its center the gear-wheel E, which meshes with the gear $C^2$. On the shaft of this gear E is fixed a gear-pinion F. Rack-bars G extend along the opposite sides of the gear F and are meshed therewith, as shown in Fig. 1. These rack-bars G are movably held in suitable guideways $G^3$ and are adapted at their rear ends at G' to be pressed upon by the feet of the operator, who, sitting on the seat $H^2$ with one foot in contact with one bar G and the other with the other one of such bars, may by pressing such bars forward adjust the gears to turn the wheels B to direct the machine either straight ahead or to either side, as may be desired, and it is obvious that but a slight movement of the rack-bars G is necessary to effect a considerable movement of the steering-wheel and that the operation of the rack-bars may be easily accomplished. The wheels H are mounted upon short shafts or axles H', being fixed thereto so the turning of such axles will effect the turning of the wheels H and so serve to propel the vehicle.

On the axles H' are fixed sprocket-wheels I, geared by a sprocket-chain I', with sprocket-wheel $I^2$ on a shaft $I^3$, having a crank-handle $I^4$ by which it may be turned. This shaft $I^3$ is journaled in upright frame plates or boards J, between which the parts I' and $I^2$ are arranged and operate, such frame-plates J forming casings for the chain-gearing at opposite sides of the driver's seat $H^2$.

The crank-handles $I^4$ are arranged one at each side of the seat $H^2$ and are preferably set with the cranks projecting in opposite directions, as shown in Fig. 1.

By the described construction it will be seen the car A may be propelled and guided by the operator, and it is obvious it may be employed to draw a car hitched thereto, as shown in the drawings. This rear car K has a suitable bed-frame K' and may be provided with a top or canopy $K^2$ and any suitable number of seats $K^3$, which may be disposed as shown or in any other suitable manner. At its rear end the bed K' is supported by the wheels L L', the wheel L being loose upon the axle $l$, while the wheel L' is fixed to such axle, thus making the wheels independent to avoid any interference in turning. The axle $l$ has a bevel-gear M, which is meshed by a bevel-gear M' on a shaft $M^2$, having a crank-handle $M^3$ suitably arranged so it may be turned by one of the occupants of the car K, and so aid in propelling the vehicle.

At its front end the bed K' is supported on wheels N, having upright shafts N', fixed at their upper ends to bars $N^2$, which extend in front and rear of the said shafts N' and have their rear ends connected by a cross-bar $N^3$ and their forward ends connected by a cross-bar $N^4$, which is connected at its center by the coupling O with the front bar A, the purpose of the construction just described being to insure the proper guiding of the rear car in connection with the movement of the front car, to which it is coupled.

In operation it will be seen my vehicle is propelled by hand and guided by the feet.

It will be understood that I do not desire, in the broad principle of my invention, to be limited to all the details of the construction shown, as the same may be varied in some respects without departing from my invention.

Having thus described my invention, what I claim, and desire to secure by Letters Patent, is—

1. The combination of the car-frame, the opposite steering-wheels journaled vertically thereto, the gear-wheels fixed to the brackets of said steering-wheels, the counter-pinion meshing with both said gear-wheels, a shaft having a gear-wheel meshed with said counter-gear and also provided with a gear-pinion and the rack-bars meshed with said gear-pinion and movable longitudinally, substantially as shown and described.

2. The combination with the car-frame, of the front steering-wheels having their brackets provided with vertically-journaled shafts, the gear-wheels secured to said shafts, the counter gear-wheel meshed with both said wheels, the shaft having a gear meshed with said counter-wheel, a pinion on said shaft, the rack-bars arranged on opposite sides of and meshed with said pinion, the independent axles arranged in rear of said rack-bar, the independent crank-handles and connections whereby they operate their respective axles, and a seat whereon the operator may be supported in position to work the crank-handles by hand and the steering rack-bars by his feet, substantially as shown and described.

3. The combination in the rear or trailing car, of the frame thereof, the steering-wheels having upright shafts journaled to said frame, bars secured at their middles to said shafts and extending in front and rear thereof, a cross-bar connecting the front ends of said bars, and the draft-coupling secured to said front bar substantially as shown and described.

FERDINAND DAMOUR.

Witnesses:
CHAS. J. SCHMITT,
CHRISTOPHER A. HURSH,
WILLIAM F. MONTGOMERY,
FRED. B. CAMPBELL,
W. L. CHAMBERLAIN,
WALTER CHAMBERLAIN,
MATTISON C. NOLAND.